Feb. 23, 1954
G. A. UNGAR
2,670,026
APPARATUS FOR MAKING HONEYCOMB CORES
FOR SANDWICH-TYPE STRUCTURES
Original Filed March 18, 1948
4 Sheets-Sheet 1
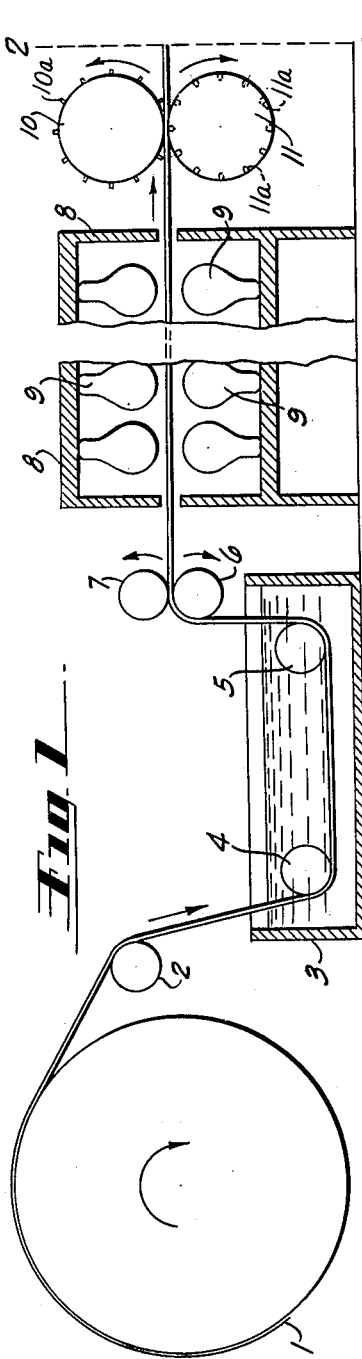
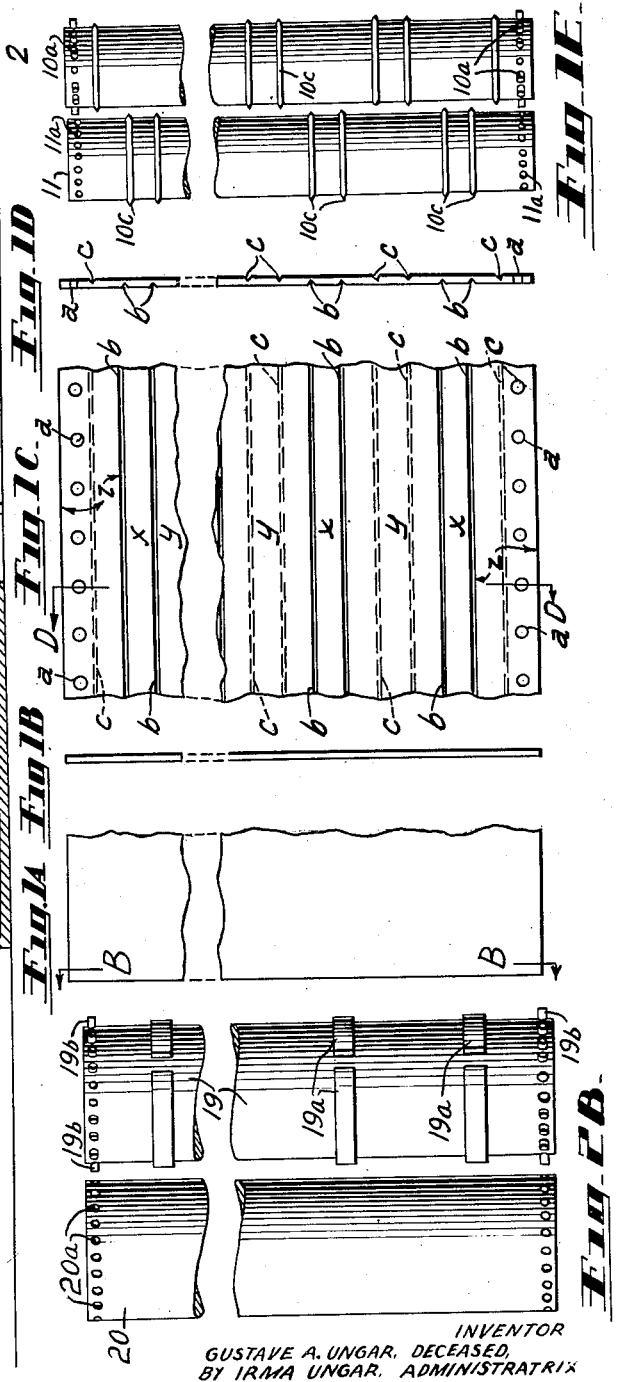
INVENTOR
GUSTAVE A. UNGAR, DECEASED,
BY IRMA UNGAR, ADMINISTRATRIX
BY *George V. Smyth*
ATTORNEY Feb. 23, 1954 G. A. UNGAR 2,670,026
APPARATUS FOR MAKING HONEYCOMB CORES
FOR SANDWICH-TYPE STRUCTURES
Original Filed March 18, 1948 4 Sheets-Sheet 2
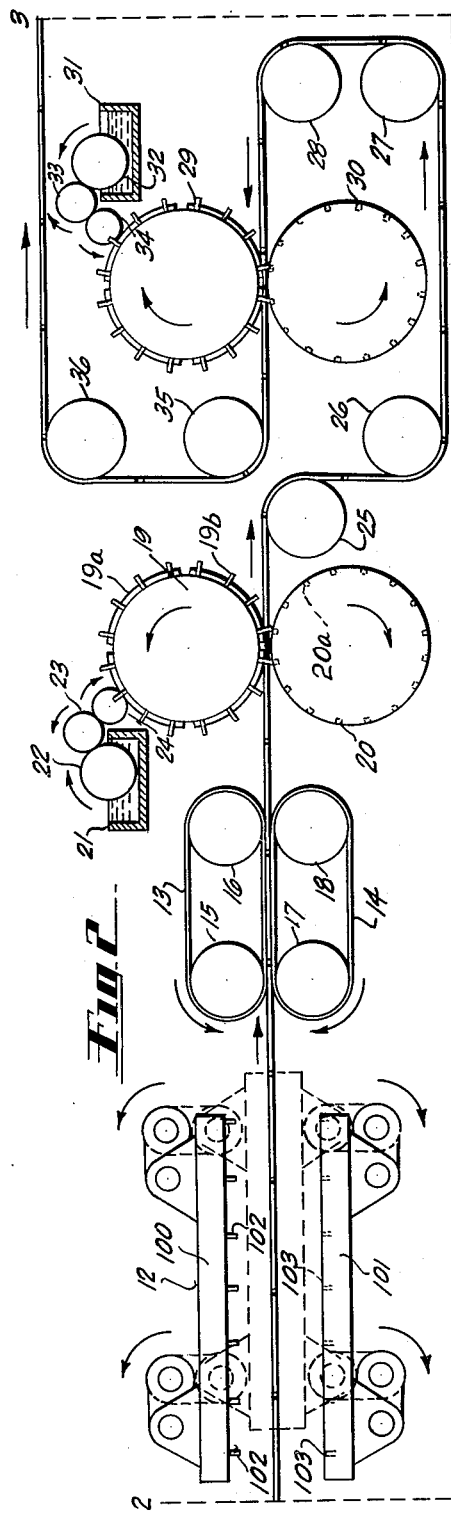
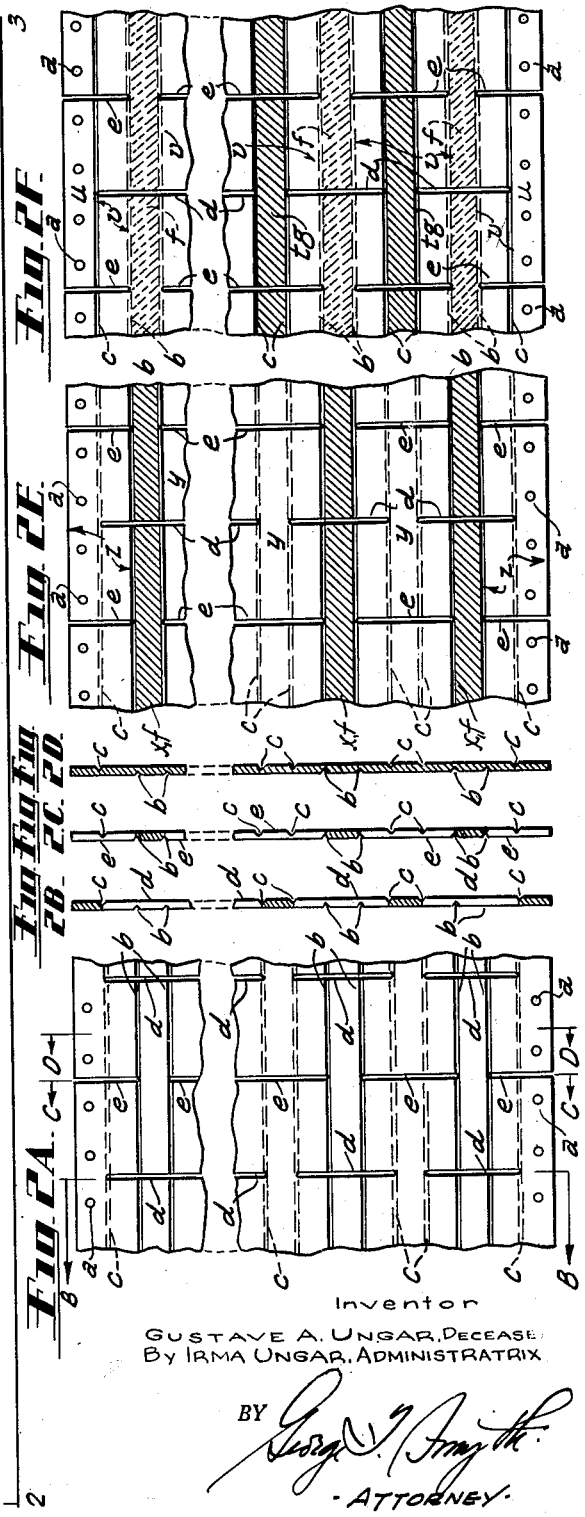
Inventor
GUSTAVE A. UNGAR, DECEASED
By IRMA UNGAR, ADMINISTRATRIX
BY
-ATTORNEY- Feb. 23, 1954 G. A. UNGAR 2,670,026
APPARATUS FOR MAKING HONEYCOMB CORES
FOR SANDWICH-TYPE STRUCTURES
Original Filed March 18, 1948 4 Sheets-Sheet 3
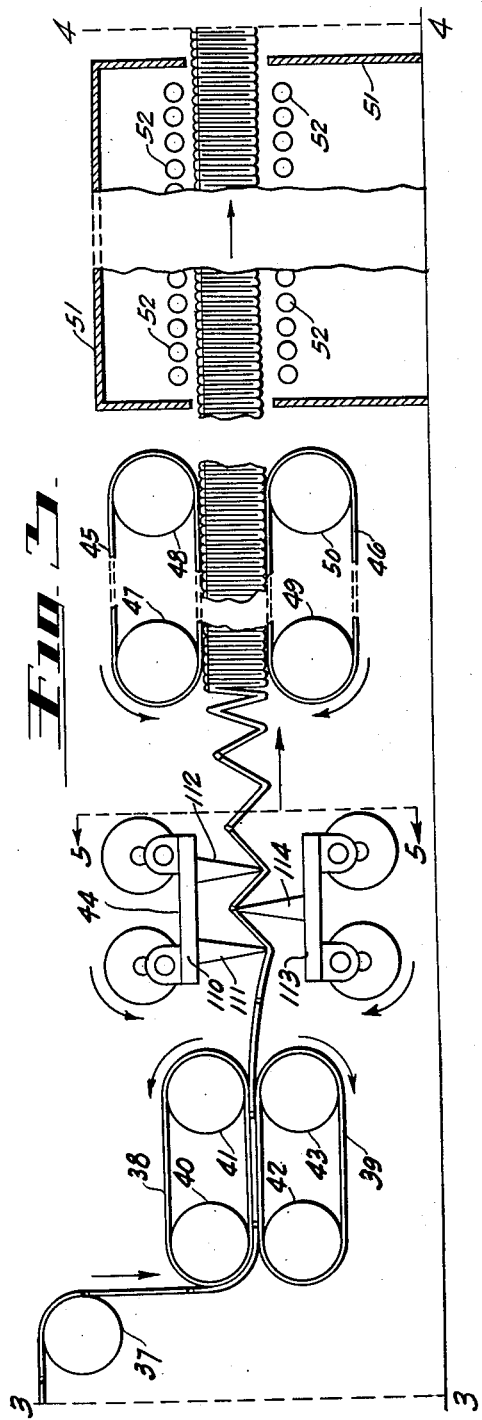
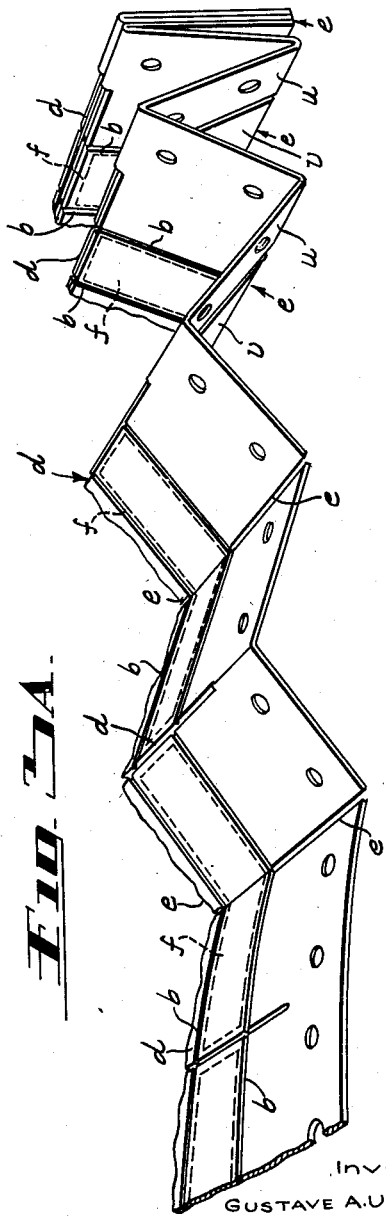
Inventor
GUSTAVE A. UNGAR,
DECEASED BY IRMA UNGAR,
ADMINISTRATRIX
BY *George V. Smyth*
- ATTORNEY -

Feb. 23, 1954            G. A. UNGAR            2,670,026
APPARATUS FOR MAKING HONEYCOMB CORES
FOR SANDWICH-TYPE STRUCTURES
Original Filed March 18, 1948            4 Sheets-Sheet 4
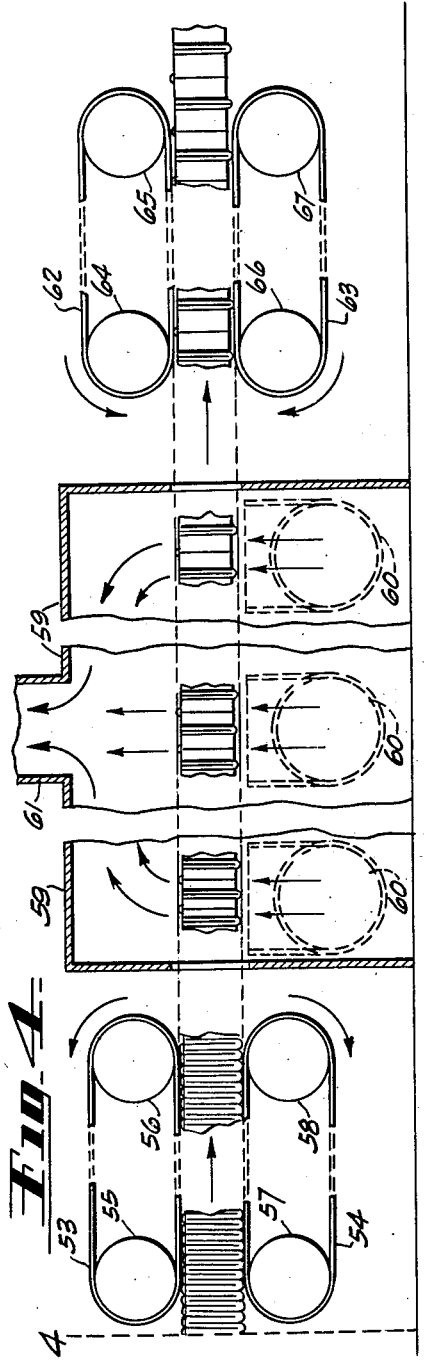
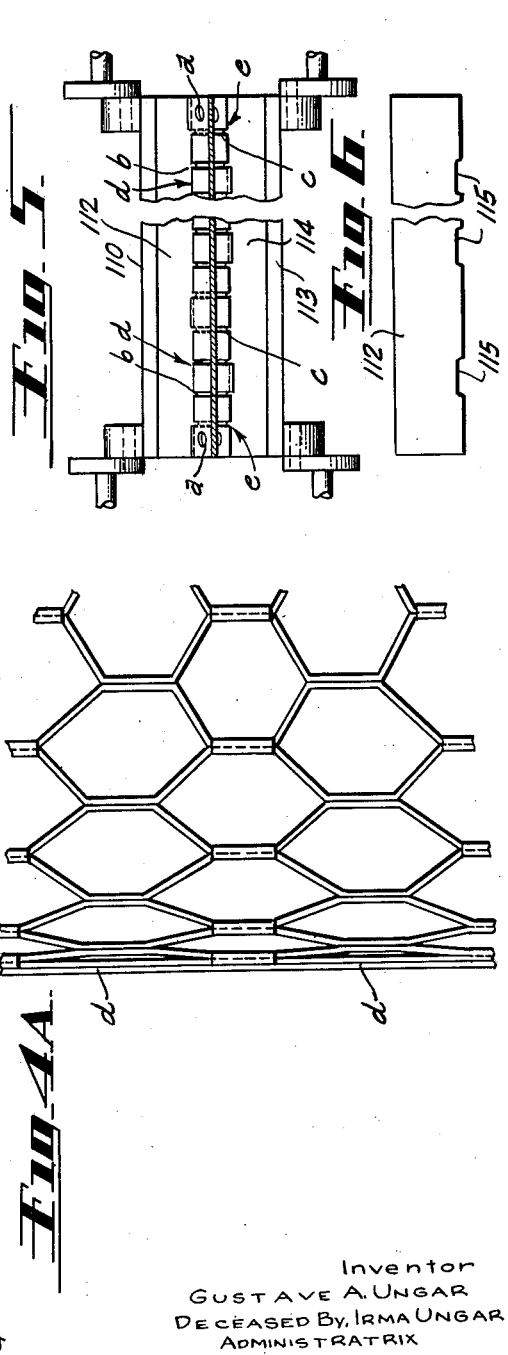
Inventor
GUSTAVE A. UNGAR
DECEASED BY, IRMA UNGAR
ADMINISTRATRIX
BY
-ATTORNEY- Patented Feb. 23, 1954

2,670,026

UNITED STATES PATENT OFFICE 2,670,026

APPARATUS FOR MAKING HONEYCOMB CORES FOR SANDWICH-TYPE STRUCTURES

Gustave A. Ungar, deceased, late of New Rochelle, N. Y., by Irma Ungar, administratrix, New Rochelle, N. Y., assignor to Douglas Aircraft Company, Inc., Santa Monica, Calif.

Original application March 18, 1948, Serial No. 15,708. Divided and this application February 1, 1952, Serial No. 269,548

14 Claims. (Cl. 154—1.8)

The present invention relates to an apparatus for producing multi-cellular webs such as honeycomb filler or core for sandwich-type panels which are of light weight and yet capable of supporting substantial loads, as when utilized as structural elements. Such panels consist of a top and bottom layer of metallic or nonmetallic sheet material, such as thin sheet metal, plywood, plastic sheeting, or plastic-impregnated cardboard and the like, which layers encompass between them a honeycomb filler or core. Such filler or core may consist of a variety of materials which provides sufficient transverse strength in the structure in which they separate the end plates to which the filler or core is suitably attached.

The general object of the invention is to provide an improved apparatus for the manufacture of such a filler or core in a continuous operation from a single sheet of material, such as paper or fabric, impregnated with any suitable plastic reinforcing agent. This application is a division of the copending application, Serial No. 15,708, filed March 18, 1948.

In the art of making honeycomb cores the usual practice has heretofore been as follows: A number of sheets, say, of paper or fabric, are striped in long parallel lines with adhesive on one or both sides, and a pile of such sheets is pressed to set the adhesive, thus resulting in a laminated pile of sheets each two adhering at the area of the striping. The honeycomb is made by cutting the stacks of sheets into the desired width, and then expanding or drawing the laminated pile as far apart as practicable, so that the nonadhering areas of the adjacent sheets bend with respect to the adhering areas thus forming a plurality of hexagonal cells. It is understood of course that the material, such as paper or fabric, is preferably impregnated with a suitable stiffening plastic or the like so that the formed honeycomb will retain its shape after expansion. After the cellular structure is obtained it is usually heated for the purpose of curing the impregnant, such structure then becoming permanent as to shape and ready for attachment thereto of the desired end plates.

The particular object of the present invention is to provide a method and apparatus for making such cores in a continuous process beginning with a single strip or web of the basic structural material, such as kraft paper (as, for example, a roll of such material), and obtaining as an end product, a complete honeycomb core. The present invention envisages the impregnating of the paper, or other material, the application of adhesive thereto, the heat-treating of the core, and the final setting thereof in ultimate form, so that the end product is ready to be cut into desired sections and used in the building of sandwich-type structures.

Thus, the novel continuous method of producing such fillers or cores, in accordance with the invention herein disclosed and claimed, converts, in a steady flow of production, the original web of basic material into a finished core, to which, if desired, the end plates can be attached while the core emerges from the production line. In the utilization of the novel apparatus, there are no interruptions for manual handling of the material between the different manufacturing steps, and therefore the present excessive labor costs are greatly reduced and an end product of greater uniformity is secured with a minimum of waste, material, time, and labor.

In the illustrated embodiment of the present invention, the apparatus comprises means, preferably cooperating rollers, suitably driven for advancing a strip or web of the basic structure material, such as kraft paper, into a bath or the like of a suitable impregnating material. The impregnating material, as the web is further advanced, may be dried but not cured by passage of the web through a zone heated to a suitable temperature. The advancing means carries the dry impregnated web between cooperating rollers which form an aligned row of equally spaced perforations adjacent each marginal edge of the advancing web.

These rollers also, in the now preferred form of the apparatus, form on opposite faces of the web longitudinally extending pairs of scores with the pairs of scores on one face of the web laterally spaced in staggered relationship to the pairs of scores on the opposite face of the web. These scores form lines of weakness which facilitate subsequent bending or folding of the web along such lines in the actual folding operation forming the cellular core structure. The apparatus also includes means for forming the web with alternate rows of slots, the slots of one row being staggered with respect to those of adjacent rows. The mechanism forming the slots in the advancing web places these slots so that the slots of every other row are separated by the space between pairs of scores on one face of the web and the slots of the other rows are separated by the space between pairs of scores on the other face of the web.

After the web has been formed with the lines of slots, the advancing means carries the web through mechanisms which apply to opposite faces of the advancing web longitudinally extending stripes of an adhesive material substantially equal in length to the distance between alternate rows of slots. The stripes are of a width equal to the distance between pairs of adjacent lines of score with the stripes on the one face of the web laterally spaced in staggered relationship to the stripes on the opposite face of the web. The web is now pleated or folded alternately in opposite directions on the lines of slots to stack the folds contiguously to unite the same on said stripes of adhesive material as the folded web is continuously advanced to form the web into a fan-folded article. By suitable heating elements as, for example, high frequency inductors, the adhesive is set to secure a bond between the adhering portions of the pleats or folds while maintaining the pleats or folds under compression. The folded pack is thereafter expanded to form a honeycomb-like structure or pack, the lines of weakness formed by the scores facilitating bending or folding of the unsecured portion of the web to form the core with very regular shaped individual cells.

If the impregnant is fully cured prior to the expanding operation, the folded pack may be softened by steam to permit the folded pack to be expanded into the honeycomb-like structure. When the impregnant has not been fully cured, but merely dried, it is preferred to cure the impregnant by passing the same through a curing oven or the like during the initial steps of expanding the folded pack so that the expanded stock will maintain the desired relationship of the cells of the honeycomb-like structure at the completion of the expanding operation.

The drawing illustrates a specific embodiment of apparatus in accordance with the invention:

Figures 1 to 4, inclusive, each on a separate sheet, together provide a diagrammatic flow sheet of the method and apparatus of the present invention. For purposes of orientation a base- or floor-line is indicated in each figure. At the righthand side of Figure 1 is a dotted line 2—2 corresponding to a dotted line 2—2 at the lefthand side of Figure 2; and, accordingly, the lines 3—3 of Figures 2 and 3, and the lines 4—4 of Figures 3 and 4 correspond. Thus the four figures may be matched to provide a continuous diagram.

Figures 1A, 1B, 1C, 1D, 2A, 2B, 2C, 2D, 2E, 2F, 3A and 4A are details illustrating the condition of the stock from which the core is made at various stages of the production process. These figures are more particularly described below.

Figure 1E is an elevational view of the cooperating rollers which perforate each marginal edge of the advancing web and form the longitudinally extending pairs of scores on the web.

Figure 2G is an elevational view of one mechanism for applying to a face of the web longitudinally extending stripes of the adhesive material.

Figure 5 is the vertical section 5—5 of Figure 3.

Figure 6 is an elevational view of one of the upper blades carried by the apparatus illustrated in Figure 5.

The method of the present invention as illustrated in the drawing involves the following operations which are first briefly described in the order in which the same take place. In the drawing arrows indicate the directions of motion.

The stock from which the core is to be made, and which may be kraft paper, fabric, or other suitable material, is fed into the train of apparatus of the present invention, from, preferably, a mill roll such as indicated at 1 in Figure 1.

The stock in web form is first carried over an aligning roller 2 down into a tank 3 containing an impregnant with which the stock is to be treated. Such impregnant might well be an aqueous solution of phenolic plastic. In Figure 1 the web is shown to be carried down beneath two submerged rollers 4 and 5. After the web emerges from the bath, excess liquid impregnant is squeezed off by means of presser rollers 6 and 7, the excess impregnant draining back into the tank 3.

The stock is next carried through a suitable oven 8 having infrared lamps 9 therein for the purpose of partially drying but not curing the impregnant. If desired, other types of heating means could be employed for drying the impregnant.

The stock or web is then carried between two cooperating rollers 10 and 11, as shown in Figures 1 and 1E, the former being provided with punches 10a set at either end thereof at regular angular intervals, and arranged to cooperate with registered sockets 11a in roller 11 so that the opposite marginal edges of the stock are each perforated with a row of equally spaced aligned holes a (cf. Figure 1C). These holes may be relied upon subsequently in the apparatus train fitted with rollers or other advancing means having pins engageable in the holes to insure travel of the stock through certain parts thereof at a predetermined rate of speed and to prevent slipping and misregister of the stock at various stages of the fabrication process. Rollers 10 and 11 may be provided with spaced circumferential scoring ridges 10c so that the stock may be scored on both sides with longitudinal scores as it passes through these rollers.

Figure 1A shows a fragment of the stock in plan before it has entered between rollers 10 and 11; Figure 1B is the section B—B of Figure 1A; Figure 1C shows a fragment of the stock in plan after it has passed between rollers 10 and 11; Figure 1D is the section D—D of Figure 1C. Figures 1C and 1D show the relative spacements of the holes a and the longitudinal scores.

The scores are equally spaced, and each alternate pair of scores is made upon a different surface of the stock (cf. Figure 1D, a sectional view). The scores upon the upper, i. e., near, surface of the stock or web, as shown in solid lines in Figure 1C, are designated b; those on the under side, as shown in dotted lines in the same figure, are designated c. See also Figures 2E and 2F, the first being a plan view of a fragment of the stock seen from the upper side, and the second being a plan view from beneath.

Thus each surface of the web or stock is scored so that two intervals of spacement appear, one being equal to the basic score interval, and the other three times as great. See Figure 1C. The scores divide the two surfaces into parallel bands. The narrow bands of the upper surface are designated x, the wide bands Y, and the marginal bands of this surface z. The narrow bands of the under surface are designated t, the wide bands v, and the marginal bands u (see Figure 2F). The purpose of scoring the stock, as will be understood, is to form lines of weakness which facilitate a subsequent bending thereof along such lines in forming the cellular core structure. In Figures 1C and 1D it is readily seen that a narrow band on one surface of the stock or web is centrally disposed with respect to a wide band on the other surface, and vice versa. In other words, the pairs of scores on one face of the web or stock are laterally spaced in staggered relationship with the pairs of scores on the opposite face of the web.

The stock is next carried into apparatus at 12, more particularly described below, which slots the stock transversely while the same is in motion, to provide the stock with alternate rows of slots $d$ and $e$, the slots of one row being staggered with respect to those of adjacent rows, as shown in Figure 2A. The length of any slot, except that of a marginal slot, is equal substantially to thrice the basic score interval. Slots $d$ are centered with respect to wide bands $v$ of the under surface of the stock or web; slots $e$ are centered with respect to wide bands $y$ of the upper surface of the stock or web.

After the stock or web is slotted it is carried forward by means of friction belts 13 and 14, which are respectively mounted on pulleys 15 and 16 and pulleys 17 and 18. Although not shown, these friction belts are driven preferably at the same rate of speed as the rate of forward movement of the mechanism 12.

Next the stock is carried between a coating roller 19 and a pressure roller 20, where the upper surface of the stock is striped intermittently with a thermo-setting adhesive along bands $x$. See Figure 2E, in which the intermittent adhesive striping is designated $f$. In Figure 2E, the adhesive striping $f$ is indicated by hachure which for convenience extends from score to score and from slot to slot, but, in practice it is desirable that the striping be intermittent so that adhesive is not impressed upon the stock sufficiently close to the edge of a slot to leak thereinto and through to the reverse surface. In Figure 3A, a figure showing part of the stock on a much enlarged scale, the adhesive striping $f$ is indicated by dotted outline, and it is seen that the edges of the intermittent striping do not coincide with the scores $b$ and slots $d$.

In the now preferred form of the invention the intermittent striping $f$ is applied to the advancing web by means of interrupted circumferential lands 19a formed about the coating roller 19. This arrangement of the lands is clearly shown in Figure 2G. Roller 19 is fed in the manner known to the art with adhesive from a well 21 by means of a dipping roller 22 and two transfer rollers 23 and 24. Roller 19 is preferably given a slight axial reciprocating motion to insure good spreading of the adhesive.

To insure proper registry of the slotted web as it moves between the rollers 19 and 20, roller 19 is formed with a plurality of punches 19b at each end thereof at regular angular intervals and arranged to cooperate with registered sockets 20a formed in roller 20. The punches and sockets coact with the perforations $a$ to move the web in proper registration between the rollers.

It should be understood that the punches and sockets are so formed relative to the lands 19a to insure that the edges of the intermittent stripings $f$ do not coincide with the scores $b$ and slots $d$.

After the upper surface of the stock has been coated with the adhesive the stock is reversed, as shown in Figure 2, by being carried over and around rollers 25, 26, 27, and 28. Preferably the latter three of these rollers are provided with circumferential lands divided by grooves so that the rollers contact the stock only at areas where the adhesive is not present. The stock, now reversed, is passed between another adhesive applying roller 29 and a pressure roll 30, this latter preferably provided with circumferential grooves which permit passage of the stock without smearing the previously applied adhesive. Roll 29, having interrupted circumferential lands, similar to the lands 19a of roller 19, operates to stripe intermittently the other surface of the stock or web with adhesive along bands $t$. Rollers 29 and 30, like rollers 19 and 20, are formed with the coacting punches and sockets to insure proper registration of the web as it is advanced between these rollers. This arrangement again is used to make sure that the stripings $f$ are applied properly to the advancing web and to prevent the adhesive entering the scores $b$ and slots $d$. Figure 2F shows the lower surface of the stock in plan after both sides have been striped with adhesive. The dotted hachure indicates, here, the previous striping on the bands $x$. In Figure 2F the intermittent adhesive stripes on bands $t$ are designated $g$. The roller 29 as seen in Figure 2 is supplied with adhesive from a well 31 by means of a dipping roller 32 and two transfer rollers 33 and 34.

Thereafter the stock is again reversed, only for the purpose of continuing the same in the original direction of travel, by means of rollers 35 and 36, and is passed over roller 37, which are preferably grooved circumferentially to avoid the adhesive stripings, and between a set of multiple feed belts 38 and 39, respectively mounted on pulleys 40 and 41 and pulleys 42 and 43. It will be understood that now, as the stock or web has adhesive on both sides thereof, it is desirable that the feed belts do not contact the imprinted surfaces. Thus the feed mechanism preferably comprises a plurality of parallel V-belts, each having an exposed surface of width slightly less than thrice the basic score interval, the belts 38 being staggered with respect to belts 39 so that the former contact the upper surface of the stock or web with the bands $y$ and the latter contact the lower surface of the stock within the bands $v$, neither set of belts thereby contacting the interrupted adhesive stripings.

Subsequently the stock is passed through apparatus designated in its entirety 44, and more particularly described below, which operates to bend or fold the web transversely in different directions at the alternate rows of slots, as shown in Figure 3 (see, also, Figure 3A, which shows a portion of the stock in perspective and illustrates the steps of forming the stock into pleats or folds.

As will be seen, the opposed members performing the folding are synchronized in relation to each other and to the rate of movement of the web in such a manner as to invariably fold the advancing web alternately in opposite directions transversely of the web at the lines of slots to continuously produce a fan-folded pack while the web is advancing. The web is so fan-folded, referring now to Figure 3A, that the first folding operation brings together the unincised adhesive stripes on the one face of the first two fold portions and the second folding brings together the unincised adhesive stripes on the opposite faces of the next two fold portions, and so on alternately, to the end that the finished pack can be expanded without rupturing any portion of the web.

Beyond the apparatus 44 the pleated stock or web is received between two additional feed belts 45 and 46, respectively mounted on pulleys 47 and 48 and pulleys 49 and 50, which belts are spaced from each other by a distance substantially equal to the height of the desired core, i. e., a distance substantially equal to the interval between the rows of slots d and e. Belts 45 and 46, driven of course at the same rate of speed, have a common velocity sufficiently less than that of the stock during its previous travel through the train of apparatus to cause the pleated stock to bank, as shown in Figure 3, so that each intermittent adhesive stripe f and g is forced against itself between the pleats of the stock and is so bonded. The web or stock, with its various pleats banked, and, in part, adhering each to the other, is next carried through an oven 51 wherein suitable heating elements, as, for example, high frequency inductors 52, heat the stock, dry the adhesive, and make the bond between the adhering portions of the pleats permanent, while the stock is fully compressed in pleated form between belts 45 and 46 and another set of belts 53 and 54 respectively mounted on pulleys 55 and 56 and pulleys 57 and 58. In order to keep the pleats of the stock banked under compression while the latter is passing through the oven 51 the velocity of the belts 53 and 54 is somewhat less than that of the belts 45 and 46.

Beyond belts 53 and 54 the web or stock passes into an oven 59 having hot air or steam ducts 60 feeding thereinto and a chimney 61 wherein the impregnant may be cured, if the same has not been fully cured in the oven 51, or wherein, if the impregnant is fully cured, the stock itself may be softened (by steam) to prevent its tearing subsequently when the pleats are expanded to form a honeycomb-like structure. Beyond the oven 59 the web is engaged by another pair of feed belts 62 and 63 respectively mounted on pulleys 64 and 65 and pulleys 66 and 67. The speed of belts 62 and 63 is sufficiently in excess of that of the belts 53 and 54 to effect an expansion of the stock or web between the two pairs of belts. Thus the banked pleats of the web are subjected to moments tending to open said pleats, but the adhering inner surfaces of the pleats cause the pleats to open only at the nonadhering portions thereof, thereby forming a honeycomb-like structure, as indicated in Figure 4A. It will be understood, of course, that the length of the train of apparatus is not intended to be indicated by the drawing, and that suitable intervals between the individual apparatus are assumed to exist. These intervals, of course, relate back to the character of the adhesive and impregnant employed, the amount of heat required at the various stages, and the speed of operation.

It is, of course, desirable that all stretching and distorting of the web or stock be at an end when the impregnant is completely cured to avoid fracturing the stock itself. It is sufficient for the purposes of the present invention that the apparatus illustrated in Figure 4 is so arranged that the web or stock passes into the oven 59 in a fairly expanded condition and leaves said oven with the impregnant fully cured.

The apparatus designated in its entirety as 12, Figure 2, is essentially a male die 100 and a cooperating female die 101, each of which is carried on a pair of four parallel crankshafts, as indicated. Once such revolution of the shafts, which are synchronized, the dies clamp the stock between them while the latter is in motion, and the male elements 102 (punches) of die 100 pierce the stock and enter sockets 103 of die 101. Modifications will be apparent. There is here shown an extremely elementary arrangement of apparatus for slotting the stock while the same is in motion.

The apparatus designated in its entirety 44, Figure 3, comprises a plate member 110 having two blades 111 and 112 rigidly fixed thereto, and another plate member 113 having an oppositely disposed blade 114 rigidly fixed thereto and centrally disposed with respect to the first mentioned blades. Both plates are mounted on crank shafts, and the shafts rotate synchronously. Once each revolution the blades assume the position indicated in Figure 3, and bend the web or stock in alternate directions at each alternate row of slots. Figure 6 shows blade 112 by itself in elevation; Figure 5 is the elevational and sectional view indicated by line 5—5 of Figure 3. It will be noticed in Figure 6 that the edge of the blade 112 is stepped back at intervals so that the edge will not contact the several segments of the interrupted adhesive stripes when bending the stock. Blades 111 and 114 are similarly formed, except that, of course, blade 114 has step-backs staggered with relationship to those of blades 111 and 112.

There is claimed:

1. Apparatus for the continuous production of a honeycomb core for sandwich-type structures from a single web of material being fed continuously which comprises a male and a female die periodically cooperating and slotting said web with a series of parallel transverse rows of slots, the slots of any row being staggered with respect to the slots of adjacent rows; means for applying on both sides of said web longitudinally extending intermittent stripes of adhesive between the slots of every other row on one side of said sheet and between the slots of the other rows on the other side of said web; cooperating, reciprocating blades continuously pleating the advanced portion of said web by bending it in alternate directions at each alternate row of slots; cooperating feed belts engaging the arrises of the pleats so formed, said belts traveling at a rate of speed less than that of the feed of said web and thereby backing up said pleats upon one another; other cooperating feed belts engaging the arrises of said pleats, the second named belts traveling at a rate of speed less than that of the first named belts and thereby compressing said pleats and bonding within each pleat one portion of each of the stripes of adhesive to another portion thereof; and other cooperating feed belts engaging said arrises, the third named belts traveling at a rate of speed in excess of that of the second named belts, thereby separating the unbonded portions of said pleats and expanding said pleats into a honeycomb-like structure.

2. Apparatus of claim 1, including means for forming a row of aligned apertures adjacent each marginal edge of said web, and advancing means carrying pins for reception in said apertures for thereafter advancing said web.

3. Apparatus of claim 1, including means for impregnating the material of said web prior to slotting, with a thermo-setting reinforcing agent, said means comprising a bath of such agent and guide rollers routing the web through such bath.

4. Apparatus of claim 1, including means for impregnating the material of said web, prior to slotting, with a thermo-setting reinforcing agent, said means comprising a bath of such agent and guide rollers routing the web through such bath; and means for drying said agent after the same has impregnated said web, said means comprising an oven through which said web is fed after having passed through said bath.

5. Apparatus for the continuous production of a core for sandwich-type structures from an elongate web of material being fed continuously which comprises: a pair of cooperating rollers, each having a plurality of circumferential scoring ridges thereon, between which rollers said web is fed, said ridges scoring said web on both sides with a series of longitudinal scores in pairs, the pairs of scores on one side being located midway between the pairs of scores on the other side; a male die and a female die periodically cooperating and slotting said web with a series of parallel transverse rows of slots, the slots of any row being staggered with respect to the slots of adjacent rows, and the slots of every other row being separated by the space between pairs of scores on one side of said web and the slots of the other rows being separated by the space between pairs of scores on the other side of said web; coating surfaces for applying on both sides of said web longitudinal stripes of adhesive between each pair of scores thereon; cooperating, reciprocating blades continuously pleating the advancing web by bending it in alternate directions at each alternate row of slots; cooperating feed belts engaging the arrises of the pleats so formed, said belts traveling at a rate of speed less than that of the feed of said web and thereby backing up said pleats upon one another; other cooperating feed belts engaging the arrises of said pleats, the second named belts traveling at a rate of speed less than the first named and thereby compressing said pleats and bonding within each pleat one portion of each of the stripes of adhesive to another portion thereof; and other cooperating feed belts engaging said arrises, the third named belts traveling at a rate of speed in excess of that of the second named belts, thereby separating the unbonded portions of said pleats and expanding said pleats into a honeycomb-like structure.

6. Apparatus for the continuous production of a honeycomb core from a continuous web of material, comprising: means at the input end of the aparatus for supporting a supply of the web material; means for continuously advancing the web therefrom; means for impregnating said advancing web with a thermo-setting reinforcing agent; means for drying said agent; means for longitudinally scoring said advancing web on both faces thereof with a series of scores in pairs, the pairs of scores on one face being located midway between the pairs of scores on the other face; means for incising the advancing web in transversely extended longitudinally equidistant lines of slots, the slots of any row being staggered with respect to the slots of adjacent rows, and the slots of every other row being separated by the pace between pairs of scores on one face of said web and the slots of the other rows being separated by the space between pairs of scores on the other face of said web; means for applying to opposite faces of the advancing web longitudinally extending stripes of uniting material with the lines on the one face relatively spaced in staggered relationship to the stripes on the other face, said stripes of uniting material having a width substantially equal to the distance between each pair of scores; cooperating, reciprocating blades continuously pleating the advancing web by bending it in alternate directions at each alternate row of slots; cooperating feed belts engaging the arrises of the pleats so formed, said belts traveling at a rate of speed less than that of the speed of said web and thereby backing up said pleats upon one another; other cooperating feed belts engaging the arrises of said pleats, the second named belts traveling at a rate of speed less than the first named pair of belts and thereby compressing said pleats and bonding within each pleat one portion of each of the stripes of uniting material to another portion thereof to effect mutual facewise contact of the contiguous pleats; and other cooperating feed belts engaging said arrises, the third named belts traveling at a rate of speed in excess of that of the second named belts thereby separating the unbonded portion of said pleats along said scores and expanding said pleats into a honeycomb structure.

7. Apparatus for the continuous production of a honeycomb core from a continuous web of material, comprising: means at the input end of the apparatus for supporting a supply of the web material; means for continuously advancing the web therefrom; means for longitudinally scoring said advancing web on both surfaces thereof with a series of scores in pairs, the pairs of scores on one face being located midway between the pairs of scores on the other face; means for incising the advancing web in transversely extending longitudinally equidistant rows of slots, the slots of any row being staggered with respect to the slots of adjacent rows, and the slots of every other row being separated by the space between pairs of scores on one face of said web and the slots of the other rows being separated by the space between pairs of scores on the other face of said web; means for applying to opposite faces of the advancing web longitudinally extending lines of uniting material with the lines on the one face relatively spaced in staggered relationship to the lines on the other face, said lines of uniting material having a width substantially equal to the distance between each pair of scores; means for folding the advancing web alternately in opposite directions on said longitudinally equidistant transversely extending rows of slots; means for stacking the folds contiguously to unite the same on said lines of uniting material to form a depthwise, breadthwise, multi-cellular, longitudinally relatively compact mass of a depth equal to the distance between said rows of slots; means, including means engaging the arrises of the folded mass for separating the unbonded portion of said folds and expanding said mass into a honeycomb structure.

8. Apparatus for the continuous production of a honeycomb core from a continuous web of material, comprising: means at the input end of the apparatus for supporting a supply of the web material; means for continuously advancing the web therefrom; means for longitudinally scoring said advancing web on both surfaces thereof with a series of scores in pairs, the pairs of scores on one face being located midway between the pairs of scores on the other face; means for incising the advancing web in transversely extended longitudinally equidistant lines of slots, the slots of any row being staggered with respect to the slots of adjacent rows, and the slots of every other row being separated by the space between pairs of scores on one face of said web and the slots of the other rows being separated by the space between pairs of scores on the other face of said web; means for applying to opposite faces of the advancing web longitudinally extending lines of uniting material with the lines on the one face relatively spaced in staggered relationship to the lines on the other face, said lines of uniting material having a width substantially equal to the distance between each pair of scores; cooperating, reciprocating blades continuously pleating the advancing web by bending it in alternate directions at each alternate row of slits; cooperating feed belts engaging the rises of the pleats so formed, said belts traveling at a rate of speed less than that of the speed of said web and thereby backing up said pleats upon one another; other cooperating feed belts engaging the rises of said pleats, the second named belts traveling at a rate of speed less than the first named pair of belts and thereby compressing said pleats and bonding within each pleat one portion of each of the lines of uniting material to another portion thereof to effect mutual facewise contact of the contiguous pleats; and other cooperating feed belts engaging said rises, the third named belts traveling at a rate of speed in excess of that of the second named belts thereby separating the unbonded portion of said pleats and expanding said pleats into a honeycomb structure.

9. An apparatus for making from an elongate web a depthwise foraminous reticule comprising: means for advancing the elongate web into the zone of operations; means for impregnating the web with a thermo-setting reinforcing agent; means for drying said agent; means for incising the advancing web on transversely extending longitudinally equidistant segmental lines of slots; means for applying to opposite faces of the advancing web longitudinally extending lines of layer uniteable material with the lines on one face of the web laterally spaced in staggered relationship to the lines on the other face; means for folding the web alternately in opposite direction along said lines of slots; means for stacking the folds contiguously to unite the same on said lines of uniteable material as said folded web is continuously advanced to form a lengthwise compact depthwise and breadthwise multicellular mass of a thickness equal to the distance between said lines of slots; means for heating said mass; means for moving said mass into heating relationship with said heating means to set said reinforcing agent; and means for thereafter expanding said advancing mass to form a honeycomb-like foraminous reticule, said last named means including means for applying steam to said expanding mass to facilitate expansion of said mass.

10. Apparatus for manufacturing a honeycomb core from an elongate web, comprising: means at the input end of the apparatus for supporting a supply of the web material; means for advancing the web therefrom forwardly of the apparatus; means for impregnating said web with a thermo-setting reinforcing agent; means for drying said agent; cooperating means for incising the advancing web in transversely extending longitudinally equidistant lines of slots; means disposed adjacent opposite faces of the advancing web for applying to said opposite faces longitudinally extending lines of uniting material with the lines of uniting material on the one face laterally offset in staggered relationship to the lines of uniting material on the opposite face; means for folding the advancing web alternately in opposite directions on said longitudinally equidistant transversely extending lines of slots; means for stacking the folds contiguously to unite the same on said lines of uniting material as said folded web is continuously advanced to form a depthwise, breadthwise, multi-cellular, longitudinally relatively compact mass of a depth equal to the distance between said lines of slots; means for applying heat to said advancing mass to set said reinforcing agent; and means, including means for bathing said mass in steam to soften the same, for thereafter expanding said advancing mass to separate the folds thereof to form a honeycomb core.

11. An apparatus for making a honeycomb core from a web, comprising: means for advancing the web into the zone of operations; means for forming on opposite faces of the advancing web a series of longitudinally extending lines of weakness in pairs, each adjacent pair of lines on one face of said web being laterally spaced in staggered relationship to adjacent pairs of lines on the opposite face; means for forming transversely extending rows of slots in the advancing web at longitudinal equidistant stations thereof, with the slots in adjacent rows so mutually staggered laterally that the slots in one of said adjacent rows are intersected by adjacent pairs of lines of weakness on one face of said web and the slots in the other of said adjacent rows are intersected by the adjacent pairs of lines of weakness on the other face of said web so that the slots of every other row are separated by the space between pairs of lines of weakness on one face of said web and the slots of the other rows are separated by the space between pairs of lines of weakness on the other face of said web; means for applying to opposite faces of the advancing web longitudinally extending stripes of adhesive material with the stripes on the one face laterally spaced in staggered relationship to the stripes on the opposite face; means for folding the advancing web alternately in opposite directions on said lines of slots; means for stacking the folds contiguously to unite the same on said lines of adhesive material as said folded web is continuously advanced to form the web into a fan-folded article; and means for thereafter expanding said fan-folded article to form a honeycomb having a multiplicity of cells defined in part by said lines of weakness.

12. Apparatus for the continuous production of a honeycomb core from a continuous web of material, comprising: means at the input end of the apparatus for supporting a supply of the web material; means for continuously advancing the web therefrom; means for impregnating said advancing web with a thermo-setting reinforcing agent; means for drying said agent; means for longitudinally scoring said advancing web on both surfaces thereof with a series of scores in pairs, the pairs of scores on one face being located midway between the pairs of scores on the other face; means for incising the advancing web in transversely extended longitudinally equidistant lines of slots, the slots of any row being staggered with respect to the slots of adjacent rows, and the slots of every other row being separated by the space between pairs of scores on one face of said web and the slots of the other rows being separated by the space between pairs of scores on the other face of said web; means for applying to opposite faces of the advancing web longitudinally extending stripes of uniting material with the stripes on the one face relatively spaced in staggered relationship to the stripes on the other face, said stripes of uniting material having a width substantially equal to the distance between each pair of scores; means for continuously pleating the advancing web by bending it in alternate directions at each alternate row of slots; means for stacking said pleats upon one another and thereby compressing said pleats to unite the same on said stripes of uniting material; and means for separating the unbonded portion of said pleats along said scores and expanding said pleats into a honeycomb structure, said last named means including means for heating said reinforcing agent to set the same.

13. Apparatus for the continuous production of a honeycomb core from a continuous web of material, comprising: means at the input end of the apparatus for supporting a supply of the web material; means for continuously advancing the web therefrom; means for longitudinally scoring said advancing web on both faces thereof with a series of scores in pairs, the pairs of scores on one face being located midway between the pairs of scores on the other face; means for incising the advancing web in transversely extending longitudinally equidistant rows of slots, the slots of any row being staggered with respect to the slots of adjacent rows, and the slots of every other row being separated by the space between pairs of scores on one face of said web and the slots of the other rows being separated by the space between pairs of scores on the other face of said web; means for applying to opposite faces of the advancing web longitudinally extending lines of uniting material between each pair of scores thereon; means for folding the advancing web alternately in opposite directions on said longitudinally equidistant transversely extending rows of slots; means for stacking the folds contiguously to unite the same on said lines of uniting material to form a depthwise, breadthwise, multicellular, longitudinally relatively compact mass of a depth equal to the distance between said rows of slots; and means for separating the unbonded portion of said folds and expanding said mass into a honeycomb structure having a multiplicity of cells defined in part by the lines of score.

14. Apparatus for manufacturing from an elongate web a depthwise foraminous reticule, comprising: means at the input end of the apparatus for supporting a supply of the web material; means for advancing the web therefrom forwardly of the apparatus; means disposed adjacent opposite faces of the advancing web for longitudinally scoring both faces of said advancing web with a series of scores in pairs, the pairs of scores on one face being located intermediate the pair of scores on the other face; cooperating means for incising the advancing web in transversely extending longitudinally equidistant lines; means disposed adjacent opposite faces of the advancing web for applying to said opposite faces longitudinally extending lines of adhesive material between each pair of scores thereon; means for folding the advancing web alternately in opposite directions on said longitudinally equidistant, transversely extending lines of incisions; means for stacking the folds contiguously to unite the same on said lines of adhesive material to form a depthwise, breadthwise multi-cellular, longitudinally, relatively compact mass of a depth equal to the distance between said lines of incisions; and means disposed onwardly of said folding means for separating the unbonded portions of said folds and expanding said mass into a honeycomb structure having a multiplicity of cells defined in part by the series of scores formed on the opposite faces of said web.

IRMA UNGAR,
*Administratrix of the Estate of Gustave A. Ungar, deceased.*

References Cited in the file of this patent

UNITED STATES PATENTS

| Number | Name | Date |
| --- | --- | --- |
| 1,473,096 | Hill et al. | Nov. 6, 1923 |
| 2,333,024 | Mathes | Oct. 26, 1943 |
| 2,472,863 | Socke | June 14, 1949 |
| 2,581,421 | Lombard et al. | Jan. 8, 1952 |